ded with humidity and heat and then blown back to the chamber, includes the step of supplying heat and humidity to the air by atomization into the circulating air of excess water of a temperature higher than that intended in the chamber. An apparatus for carrying out the method includes a chamber comprising one or more subunits, through which subunit(s) the products to be thermally treated are passed, a fan which on its draught side is connected with the subunit for exhaustion of the humid air and on its delivery side with a flow passage for blowback of the humid air to the subunit, and a water atomizer for water of a higher temperature than that desired in the scalding chamber. The method provides for obtaining a stable heat treatment at varying load and actions of heat and cold.

United States Patent [19]

Borup

[11] Patent Number: 5,045,021
[45] Date of Patent: Sep. 3, 1991

[54] METHOD OF THERMAL TREATMENT AND AN APPARATUS FOR CARRYING OUT THE METHOD

[75] Inventor: Uffe Borup, Himmelev, Denmark

[73] Assignee: Slagteriernes Forskningsinstitut, Roskilde, Denmark

[21] Appl. No.: 472,288

[22] Filed: Jan. 30, 1990

[30] Foreign Application Priority Data

Jan. 31, 1989 [DK] Denmark ................... 421/89

[51] Int. Cl.⁵ .............................................. A22B 5/08
[52] U.S. Cl. ........................................ 452/74; 452/80
[58] Field of Search ................. 17/51, 15, 13, 14, 20, 17/47, 11.2, 11.1; 452/74, 77, 80

[56] References Cited

U.S. PATENT DOCUMENTS

| 3,253,296 | 5/1966 | Brown | 17/11.2 |
| 3,343,477 | 9/1967 | Ekstam | 17/47 |
| 3,703,021 | 11/1972 | Sharp | 17/47 |
| 4,279,059 | 7/1981 | Anderson et al. | 17/51 |
| 4,653,148 | 3/1987 | Getz | 17/47 |
| 4,731,908 | 3/1988 | Thorsen | 17/15 |
| 4,829,637 | 5/1989 | Norrie | 17/51 |
| 4,868,950 | 9/1989 | Harben, Jr. | 17/51 |

FOREIGN PATENT DOCUMENTS

| 84222595.8 | 2/1985 | European Pat. Off. | |
| 155031 | 5/1982 | Fed. Rep. of Germany | 17/51 |
| 105798 | 1/1965 | Norway | |

Primary Examiner—Willis Little
Attorney, Agent, or Firm—Banner, Birch, McKie & Beckett

[57] ABSTRACT

A method of heat treatment of products advanced through a chamber by circulation through the chamber of hot, humid air that is evacuated, is supplied with humidity and heat and then blown back to the chamber, includes the step of supplying heat and humidity to the air by atomization into the circulating air of excess water of a temperature higher than that intended in the chamber. An apparatus for carrying out the method includes a chamber comprising one or more subunits, through which subunit(s) the products to be thermally treated are passed, a fan which on its draught side is connected with the subunit for exhaustion of the humid air and on its delivery side with a flow passage for blowback of the humid air to the subunit, and a water atomizer for water of a higher temperature than that desired in the scalding chamber. The method provides for obtaining a stable heat treatment at varying load and actions of heat and cold.

15 Claims, 5 Drawing Sheets

METHOD OF THERMAL TREATMENT AND AN APPARATUS FOR CARRYING OUT THE METHOD

BACKGROUND OF THE INVENTION

The invention relates to a method of heat treatment of products advanced through a chamber by circulating through the chamber hot, humid air that is exhausted and supplied with humidity and heat and then blown back to the chamber, and an apparatus for use in the method.

The method and the apparatus according to the invention are generally applicable and may thus for instance be used for thawing out frozen products but have primarily been developed and tested in connection with the scalding of carcasses, in particular pig carcasses, and the invention will therefore be described in the following particularly in connection with such application.

It is known in so-called suspension steam scalding to scald pig carcasses in a chamber by treatment with hot, humid air or air containing particles of water. The pig carcasses are then scalded either by the condensation of the steam on the rind surface or by hot particles of water from the circulating air.

NO patent No. 105 798 discloses an apparatus for the treatment of carcases in a chamber with a vertically rising flow of steam by exhaustion of vapour from the upper end and blowback of the steam to the lower end. Humidity is supplied as vapour by means of an evaporator at the lower end of the chamber.

DK patent No. 116 190 deals with an apparatus for thermally treating products, in particular for scalding carcases, in which steam is applied to the circulating air, following which it is guided past refrigeration units causing the humidity of the air to condensate as a fog of floating droplets. The products are then thermally treated with a fog of hot particles of water. The apparatus is extremely energy consuming because large amounts of heat get lost through the refrigeration units.

In another practised apparatus the consumption of vapour is reduced by replacing the refrigeration units by heating units which together with the supply of aqueous vapour maintain a well defined temperature and humidity of the air in a chamber, e.g. 85 to 90% of relative humidity. The control of the heating units and the supply of vapour are effected by means of a humidity sensor and a temperature detector, but at varying loads of the chamber it has turned out to be difficult to obtain satisfactory joint control of temperature and humidity. An example of a process utilizing such an apparatus is disclosed in DK patent application No. 5006/84 dealing with a method of scalding carcases by directing a hot, humid jet of air having a relative humidity of no less than about 80% and a temperature of about 62° C. towards every part of the suspended carcases.

DK patent application No. 1643/85 relates to an apparatus for scalding suspended carcasses in which heat and humidity are imparted to the circulating air by means of a combination of water atomizers and burners discharging directly in the duct for blowback of the circulating air to the chamber. A problem involved by this method is the presence of exhaust gas in the treatment air.

With a view to thawing out frozen products use is nowadays made of chambers with injection of hot air with controlled humidity.

In this respect the control of temperature and time according to a fixed program for the actual product is generally practised. It is very important that the temperature is controlled very strictly and that the air humidity is kept above a determined level, since too dry air, e.g. when thawing out frozen products, causes such products to become dry on their surface, thereby lowering their quality and value, and since a too quick thawing out implies a too heavy loss of drippage, following which the products also decline.

A general problem of the known methods and apparatuses is unstableness at fluctuating loads and other heat/cold stresses from outside, thereby hampering an exact, controlled heat treatment.

It is the object of the present invention to provide an inexpensive and effective method of heat treatment capable of eliminating unstableness as regards temperature and humidity at varying load or other heat/cold stresses.

SUMMARY OF THE INVENTION

It has now turned out that the purpose according to the invention is obtained by a method characterized in that heat and humidity are supplied to the air by atomizing excess water into the circulating air, in relation to saturation thereof with steam, at a temperature higher than that desired in the chamber.

This method provides for obtaining a very stable heat treatment because it inherently neutralizes fluctuations. If the temperature for instance falls in the chamber, for instance due to increasing load, a smaller quantity of water will simply evaporate from the surface of the water particles that are atomized into the flow of air, thereby requiring a smaller amount of heat to be bound as heat of evaporation, thereby counteracting the drop of temperature. If the temperature in the chamber rises, correspondingly more water will be evaporated from the particles of water and atomized into the circulating air, and a larger amount of heat will be bound as heat of evaporation, thereby preventing the temperature from increasing. A very quick re-adjustment to the desired processing parameters is thus obtained.

As it appears from the above it is completely decisive of the method concerned that a sufficiently large surface area of the water particles be provided in order to obtain an effective transition of $H_2O$ from the liquid phase to the gas phase.

The method according to the invention is very economical as regards energy and entails the additional advantage that energy is only consumed in the on-load condition of the chamber, since water is not condensed in the chamber when unloaded and, therefore, the atomized water will not evaporate but may merely be recirculated. Moreover, the method is very flexible as regards the heat source for heating water to a higher temperature than desired in the chamber. For heating purposes, use may thus be made of waste heat from anywhere in the slaughterhouse. In this respect it should be observed that in a slaughterhouse hot water at a temperature of about 82° C. is generally available.

The method according to the invention is, moreover, economical as regards water consumption as an expected consumption of water per pig carcasses is about 3 to 6 liters or even down to ½ liter.

The effective, stable method according to the invention makes it possible to eliminate the problems of red-colouring the neck and head regions of the pig carcasses that might occur by the prior methods of suspension scalding which is due to insufficient effectiveness.

Advantageously, the temperature of the water is regulated by means of a controllable heat source, and the excess of atomized water is recirculated.

After the above atomization an atomization of water of a lower temperature is advantageously effected into the circulating air in order to ensure a substantially complete saturation of the circulating air with steam.

In the method according to the invention it may be advantageous to supply dry heat to the circulating air by means of a heat source prior to said atomization of water of a temperature higher than that desired in the chamber, in particular at the beginning of the process to obtain a quick adjustment to the desired process parameters.

As mentioned above, the method according to the invention is of essential interest in connection with the scalding of carcases and is particularly advantageous in the so-called "suspension scalding" of pig carcasses. In that respect the air is kept at a temperature in the range between 60° and 75° C. and a relative humidity of at least 90%.

It may be advantageous to vary the temperature and/or humidity throughout the chamber to obtain the optimum heat treatment. This is expediently obtained by independent and individual control of the temperature in sections throughout the chamber by treating the air as outlined above in a number of separate air circulation circuits.

The invention also relates to an apparatus for heat treatment of products advanced through a chamber, comprising one or more subunits, through which the products to be subjected to heat treatment are passed, and a fan which on its draught side is connected with the subunit for exhaustion of the humid air from the chamber, and on its delivery side with a flow passage for blowback of the humidified air to the subunit, and characterized in that it includes a water atomizer for water of a higher temperature than that desired in the chamber, and a heat source for heating the water to be supplied to the water atomizer.

Said heat source may in an embodiment of the apparatus according to the invention be a heat exchanger with controlled supply of heat medium, preferably by means of a control device. The above mentioned water atomizer discharges advantageously in the flow passage.

In an embodiment of the apparatus according to the invention a further atomizer for water having a lower temperature may be positioned after the first mentioned atomizer. A heat source for the supply of dry heat may be positioned before the first mentioned atomizer, said heat source being advantageously according to an embodiment a heat exchanger with controlled supply of heat medium, preferably by means of a control device allowing the admission of heat medium at a considerable thermal deficit in the circulating air.

A preferred embodiment of the apparatus according to the invention is characterized in that a basin is arranged below the water atomizer or each water atomizer in the flow passage, each basin being connected with the corresponding water atomizer.

According to this embodiment the non-evaporated water, atomized into the circulating air, is collected in the basin from which it may easily be recirculated to the water atomizers. This provides for obtaining a good water and energ economy.

The heat source for heating the water recirculated to the water atomizer to a desired temperature is according to an additional embodiment of the apparatus according to the invention disposed in or in association with the basin below said water atomizer.

Preferably, the flow passage on the delivery side is connected with the subunit according to prior art through a series of tubes provided with openings uniformly distributed over the wall of the subunit, chamber. Such an arrangement provides for obtaining an effective distribution of the humid air injected into the subunit, and the rind surface is scalded at a constant air velocity substantially all over the entire surface of the carcase.

In order to vary the temperature and/or humidity throughout the chamber, thereby obtaining a high flexibility and improved control with a view to the heat treatment of the products in the chamber the apparatus according to the invention may, as mentioned above, comprise a series of sections or subunits corresponding to apparatuses as stated in the preceding, and in mutual alignment. Each of said sections may have a separate air circulations systems for the supply of heat and humidity to the circulating air so that the temperature and/or air humidity may be controlled individually in each of the sections of the apparatus.

DETAILED DESCRIPTION OF THE PREFERRED EMBODIMENTS

Figure 1:
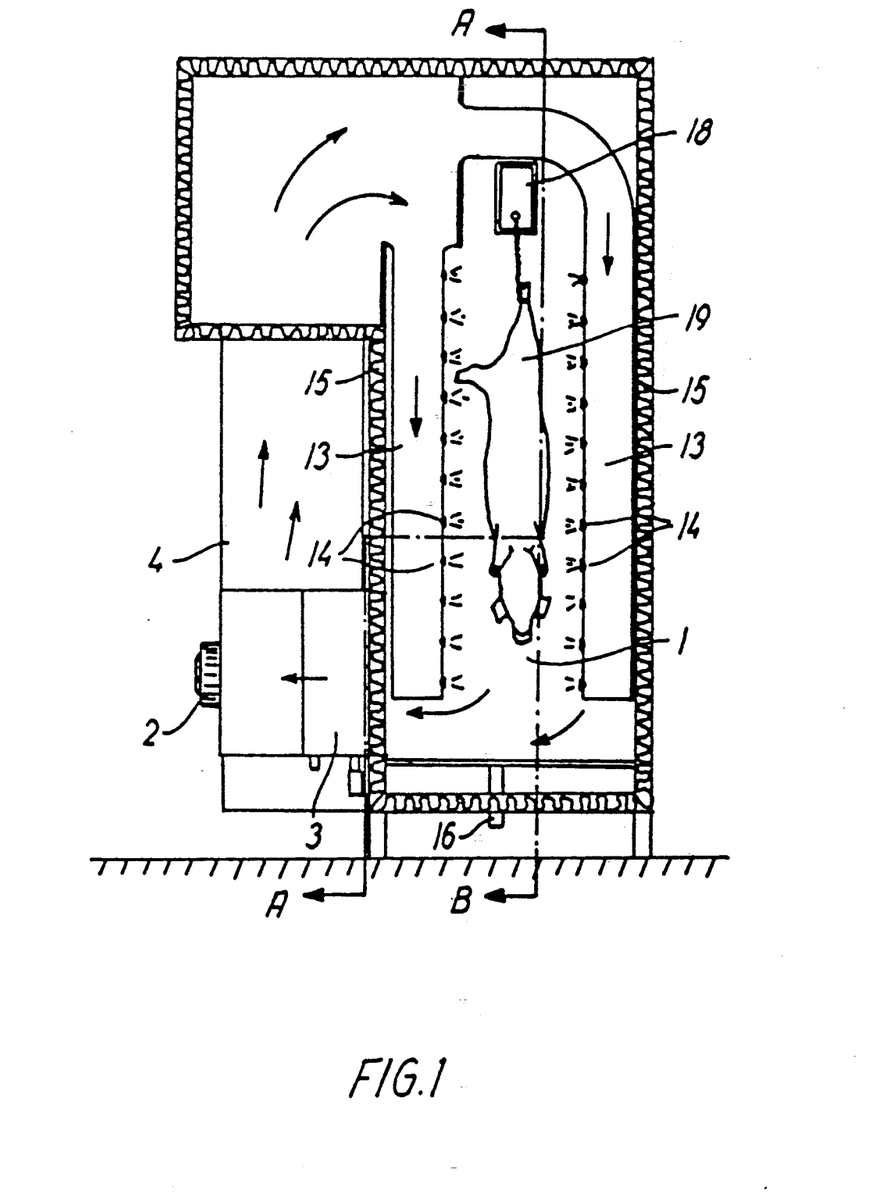
FIG. 1 is a schematical, cross-sectional view of an apparatus according to the invention.

In FIG. 1 a scalding chamber (or a subunit thereof) is designated 1 in which the carcases are subjected to treatment. At the bottom the chamber is provided with an outlet 16 for condensed water. The air is passed from chamber 1 through a heat exchanger 3 to the draught side of a fan 2 connected on the delivery side with two successive air humidifiers. After the air has been heated and humidified therein it flows out into a duct. The flow passage formed by the humidifiers and the duct is designated 4. From the duct the air is again injected into the chamber 1 through hollow tubes 13 provided with a series of holes or nozzles 14 for distributing the hot and humidified air, said holes or nozzles being positioned upwards the insulated chamber wall 15.

A conveyor 18 for the suspension and continuous conveyance of the carcases 19 is positioned at the top of chamber 1.

Figure 2:
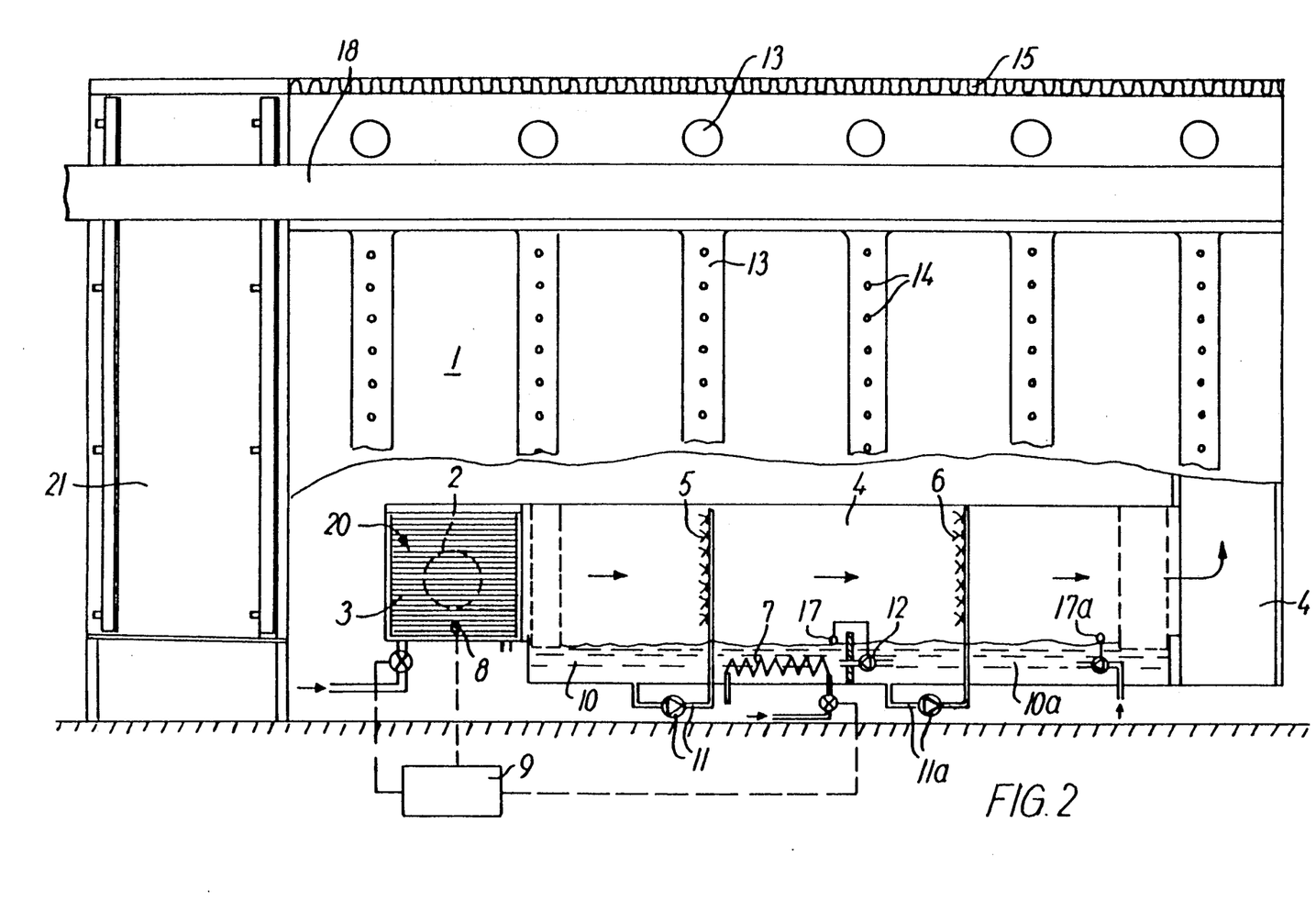
FIG. 2 is a section of a first subunit in the same apparatus according to the invention along the line A—A in FIG. 1.

FIG. 2 illustrates the part of the air circulation circuit through which humidity and heat are supplied to the air.

The first air humidifier accomodates a water atomizer 5. Said atomizer may be of any arbitrary type making provision for a sufficiently good atomization to obtain the desired area of water film on the water particles. An additional atomizer 6 is accommodated in the second air humidifier. Basins 10 and 10a for collecting the part of the water that is atomized into duct 4 but does not evaporate, are located under each of atomizers 5 and 6. Basins 10 and 10a supply water to their respective atomizer through pumps 11 and 11a. In basin 10 the water is kept heated by means of a heat source 7. Heat source 7 may be of an arbitrary, appropriate heat source, such as a heat exchanger capable of utilizing, as the heat medium, excess water from other processing steps in the slaughterhouse.

A temperature detector 8 is positioned at the exhaust outlet 20 and immediately before heat exchanger 3. It is connected with a control device 9 controlling the supply of heat medium to heat exchanger 7 and supplying supplementary heat to basin 10 upon fall of the air temperature.

The two basins 10 and 10a are in communication through a valve 12 that is opened by means of a level sensor 17 in basin 10, and still a level sensor 17a is arranged in vessel 10a for the supply of supplementary water.

The hot water for atomizer 5 may also be completely or partially supplied directly from outside and may for instance be obtained by means of excess heat from other processing steps in the slaughterhouse.

Control device 9 also controls the supply of heat medium to heat exchanger 3, however, preferably so that heat medium is only admitted when heat source 7 in itself is not capable of covering the need for heat for a shorter time. Thus, heat exchanger 3 begins particularly to function upon starting the plant and when subjected to constantly heavy load by carcases, and is supplementing source 7.

The heat medium in heat exchanger 3 is advantageously vapour but may as well be any other suitable medium.

The shell side of heat exchanger 3 may be in connection with basin 10a so that the used heat medium, in this case vapour, may be supplied by means of level sensor 17a to basin 10a as supplementary water.

In respect of providing a uniform air flow a diffusor shown in dashed lines in FIG. 2 may be arranged at the air inlet of the first humidifier. A set of baffles may further be positioned at the air outlet of the second humidifier, likewise as shown.

The apparatus includes sluices 21 for feeding the carcases into chamber 1 and for discharging them, of the type having two sets of "doors" made from a rubber material and arranged in mutual alignment. Said doors are pushed open by the gravitational force of the carcases.

Figure 3:
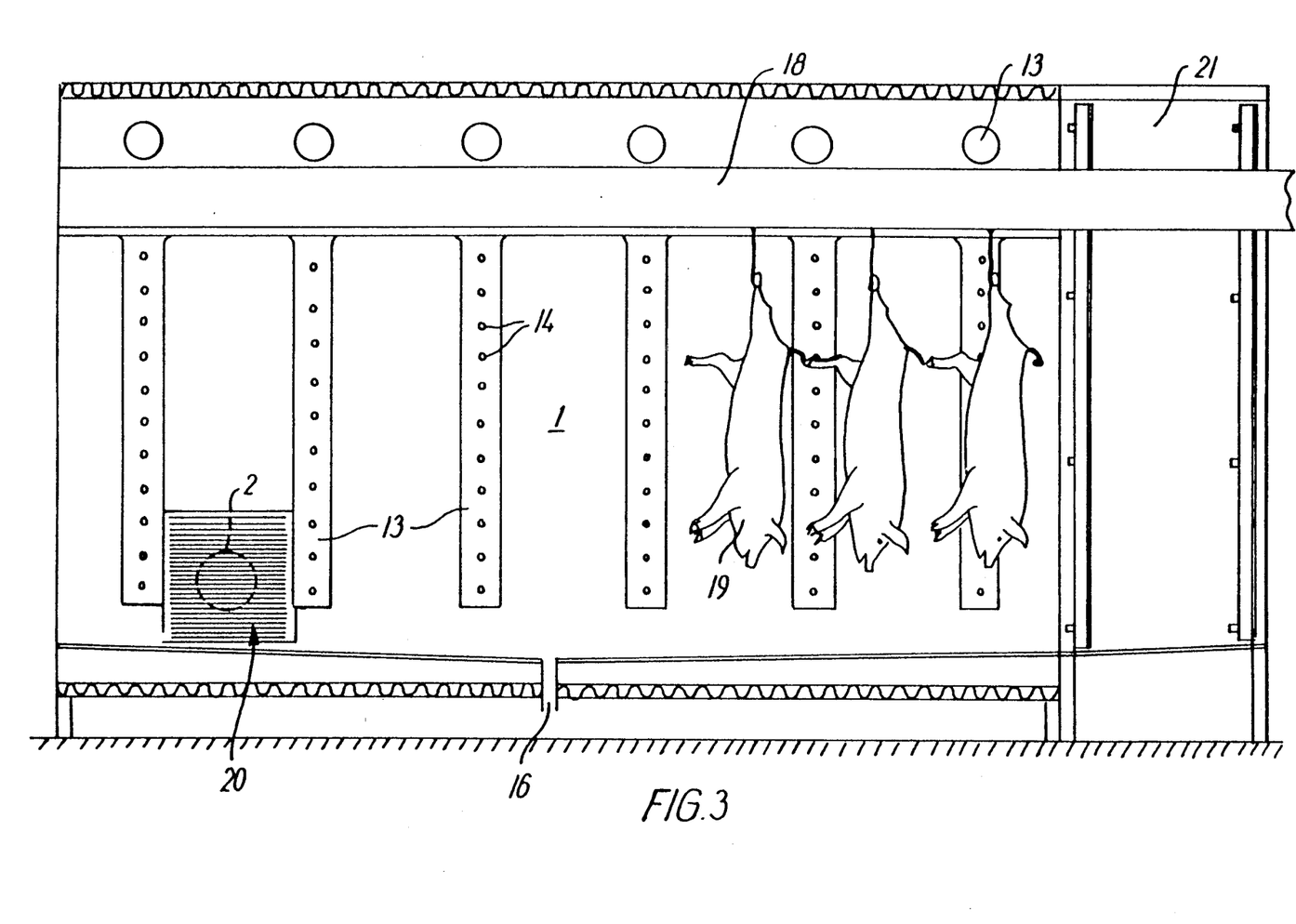
FIG. 3 illustrates a section of a last subunit in the same apparatus according to the invention along the line A—B in FIG. 1.

FIG. 3 illustrates the distance between the porkers continuously conveyed through chamber 1.

The tubes 13 for the humidified air are uniformly spaced apart throughout chamber 1.

Nozzles 14 may be disposed adjustably so that the porkers are treated with a uniform air flow all over their surface.

Figure 4:
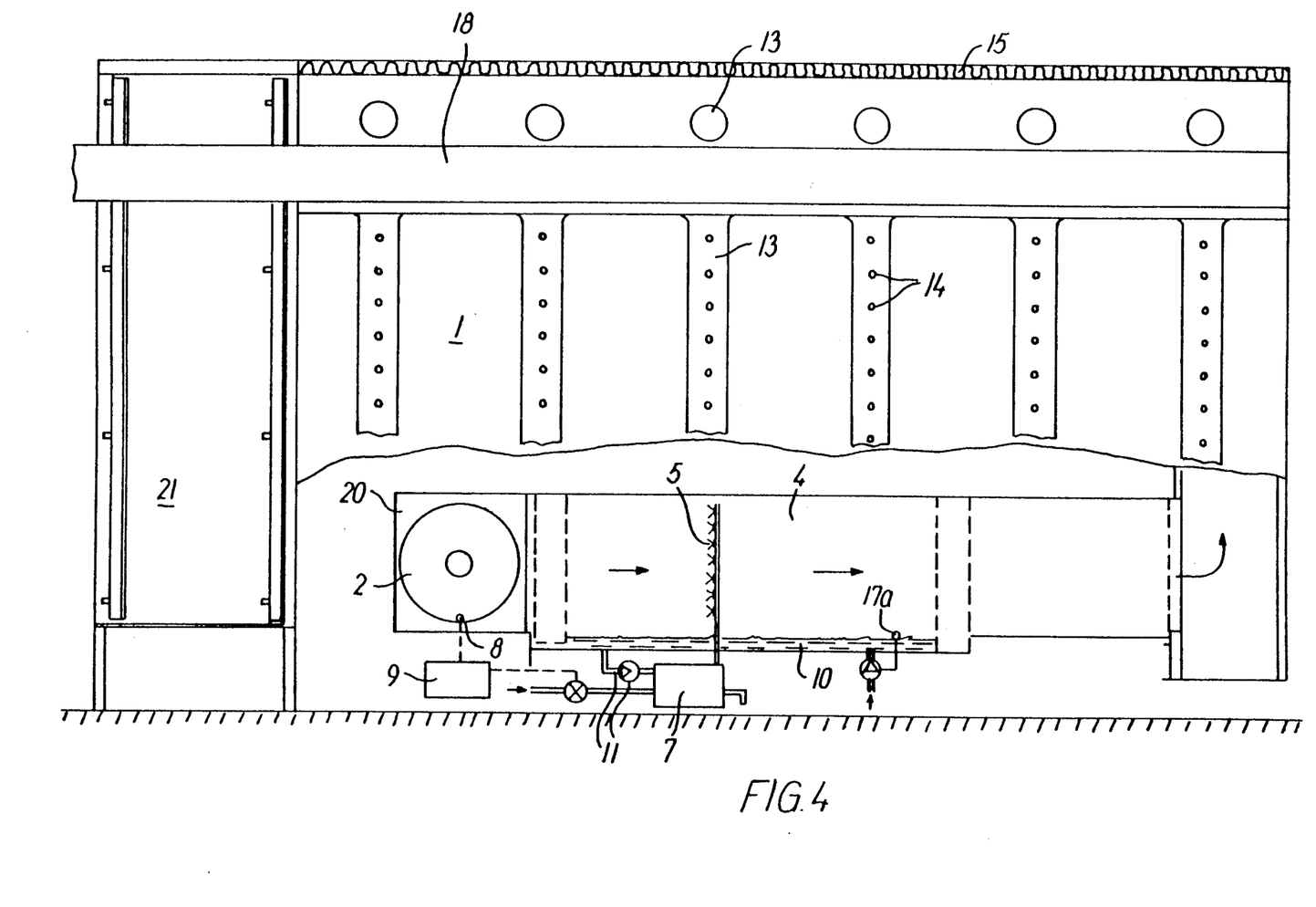
FIG. 4 is another embodiment of the section as shown in FIG. 2.

FIG. 4 illustrates a preferred embodiment of the part of the air circulation circuit through which humidity and heat are supplied to the air.

The air humidifier accommodates a water atomizer 5 of a type as mentioned above in connection with FIG. 2. Basin 10 for collecting the part of the water that is atomized into duct 4 but does not evaporate is located under atomizer 5. Basin 10 supplies water through pump 11 and further through the tube side of heat exchanger 7 to water atomizer 5, said water supplied to water atomizer 5 being heated by means of an appropriately heated liquid supplied to the shell side of heat exchanger 7. Preferably said appropriately heated liquid is excess water from other processing steps in the slaughterhouse.

A temperature detector 8 is positioned at the exhaust outlet 20. It is connected with a control device 9 controlling the supply of heat medium to the shell side of heat exchanger 7 and supplying supplementary heat to the water atomizer 5 upon fall of the air temperature.

A level sensor 17a is arranged in basin 10 for the supply of supplementary water.

The apparatus includes sluices 21 as mentioned in connection with FIG. 2.

Figure 5:
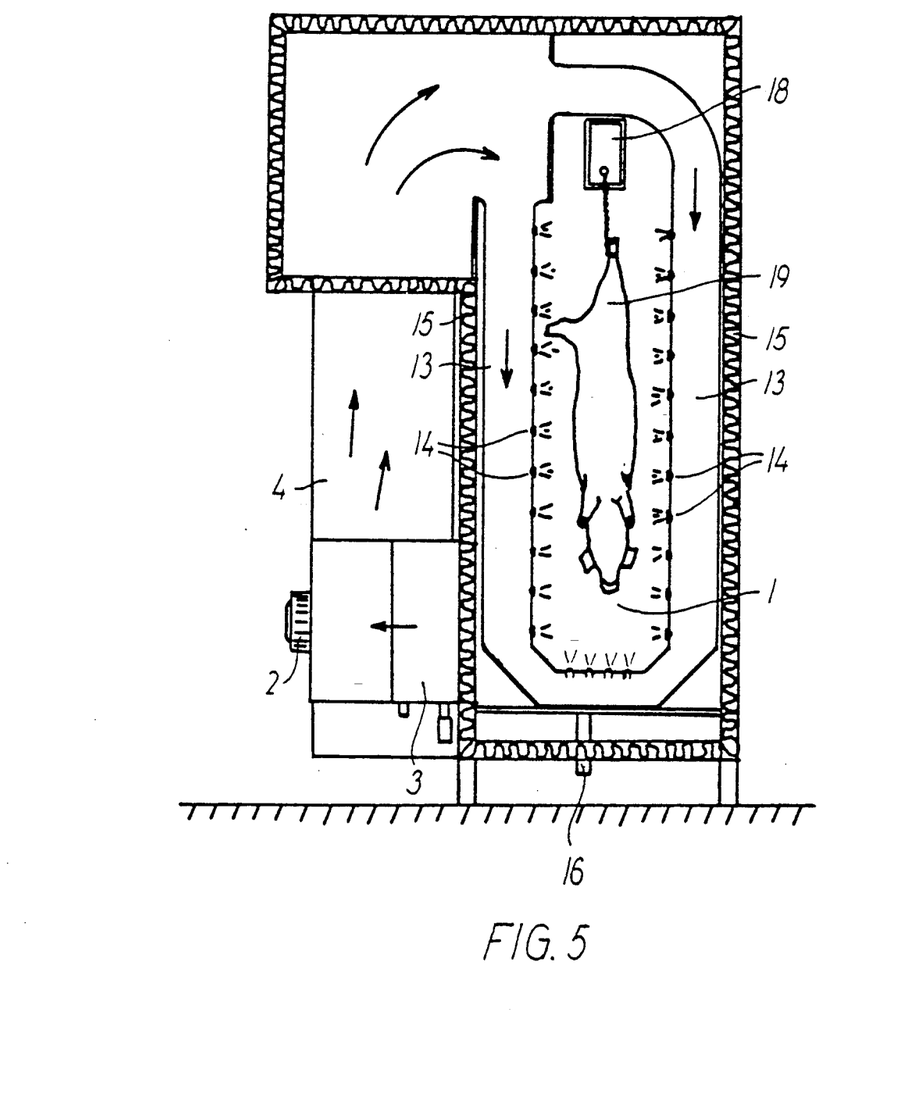
FIG. 5 is a schematical cross-sectional view of an apparatus according to the invention as shown in FIG. 1, but with another arrangement of holes for distributing hot and humidified air.

FIG. 5 is a variant of the apparatus according to the invention illustrated in FIG. 1, in which the guiding of tubes 13 is so that part of the holes or nozzles 14 will flow the heated and humidified air from below and upwards against the suspending carcases.

The chamber may be composed of subunits and the length of the chamber may thus be varied arbitrarily by choice of a suitable number of subunits. The capacity of the chamber may thus be varied. One subunit may comprise an air circulation circuit for the exhaustion of air from the subunit, supply of humidity and heat to the air and blowback thereof to the subunit. The apparatus may thus consist of a series of such subunits in mutual alignment, following which the temperature and humidity may be controlled separately in the individual subunits.

This is particularly desirable with respect to the suspension scalding of pig carcasses, a higher temperature at the beginning of the chamber causing the rind surface to be rapidly heated to the desired temperature which is then upheld during conveyance through the chamber.

The invention will now be further elucidated by by means of non-limiting examples.

EXAMPLE 1

In this example reference is made to FIGS. 1 to 3 of the drawings.

Stuck porkers i.e. pig carcasses are after bleeding passed into chamber 1 by conveyor 18. The carcases are conveyed through chamber 1 at a velocity regulated so as to obtain a stay of time for 4 to 9 minutes, preferably 5 to 7 minutes, in dependence on the temperature in the chamber. During the stay within chamber 1 the carcases 19 are treated with the humidified injected air, following which they leave the chamber, and the bristles are easily torn out in a following dehairing machine.

During the stay in the chamber the humid air is exhausted from chamber 1 through exhaustion outlet 20 and the temperature thereof is detected by means of temperature detector 8. The air is passed through heat exchanger 3 supplying dry heat thereto, if necessary, during starting, peak load periods or in similar situations in which the heat source 7 is not capable of generating the required amount of heat to rapidly obtain the intended working temperature of the circulation air. In said cases control device 9 turns on heat medium and regulates the amount of heat medium supplied to heat exchanger 3. The air is exhausted further through fan 2 and is injected into the first humidifier in which excess water of a higher temperature than that intended in chamber 1 is atomized by means of water atomizer 5, thereby obtaining a good contact between the water droplet surface of the injected particles and the circulating air. The air is thereby humidified by evaporation of water from the water droplet surface. The evaporated quantity of water depends on the temperature of the air and on the temperature of the water and on the contact between the air and the water droplet surface, including the total area of surface of the droplets. The circulating air further receives heat from the hot water atomized into the air.

In the second humidifier water of a lower temperature is subsequently atomized into the circulating air through water atomizer 6, thereby ensuring substantially complete saturation of the air with aqueous vapour.

The non-evaporated portion of the atomizer water is collected in basins 10 and 10a from which it is fed back directly to water atomizer 6 for atomization and to water atomizer 5, respectively, after heating by means of heat source 7. The temperature of the water in basin 10 and thus of the water in atomizer 5 is regulated by controlling the supply of heat medium to heat source 7 by means of control device 9. Temperature detector 8 transmits a measuring signal to control device 9 which opens for the supply in dependence on the difference between intended and detected temperature of the air. Supplementary water is supplied to basin 10a as a compensation for the evaporated water. The amount of supplementary water is controlled by means of level sensor 17a. Supplementary water to basin 10 is supplied from basin 10a by means of valve 12 controlled by level sensor 17.

The hot air thus humidified is injected into chamber 1. Upon contact with the colder pig carcasses 19 water will condense on the surface thereof, thereby effecting a heating of the rind surface. The heating of the rind surface depends on the temperature and humidity of the treating air and on the contact between the injected air and the rind surface.

The chamber temperature is kept at a value in the range from 60° to 75° C., preferably from 61° to 67° C. It depends on the time of treatment so that a shorter time of treatment necessitates a higher temperature.

After starting and upon adjustment to the desired process parameters during the supply of dry heat by means of heat exchanger 3 and during the supply of heat by means of the hot water atomized into the circulating air by atomizer 5, the necessary heat may under normal operating conditions be supplied to the air solely from the atomized hot water.

Pig carcasses scalded in this manner have turned out to possess a very fine rind quality without red-colouring of the neck and head regions.

EXAMPLE 2

This example illustrates a preferred embodiment of the invention wherein pig carcasses are scalded according to the invention in an apparatus according to the invention comprising two consecutive chambers or subunits each including an air circulating circuit as illustrated in FIG. 4.

Stuck porkers i.e. pig carcasses are after bleeding passed into first chamber 1 by conveyor 18. Said porkers are conveyed through chambers 1 at a velocity regulated to as to obtain a stay of time for 6½ minutes. During the stay within chambers 1 the pig carcasses 19 are treated with humidified injected air, following which they leave second chamber 1, and the bristles are easily torn out in a following deharing machine.

During the stay in each chamber the humid air is exhausted from chamber 1 through exhaustion outlet 20 and the temperature thereof is detected of means of temperature detector 8. The air is exhausted further through fan 2 and is injected into the humidifier in which excess water of a higher temperature than that intended in chamber 1 is atomized by means of water atomizer 5, thereby obtaining a good contact between the water droplet surface of the injected particles and the circulating air. The air is thereby humidified by evaporation of water from the water droplet surface. The evaporated quantity of water depends on the temperature of the air and of the temperature of the water and on the contact between the air and the water droplet surface, including the total surface of the droplets. The circulating air further receives heat from the hot water atomized into the air.

The non-evaporated portion of the atomized water is collected in basin 10 from which it by means of pump 11 is let through the tube side of heat exchanger 10 to water atomizer 5. The temperature of the water in atomizer 5 is regulated by controlling the supply of heated liquid to the shell side of heat exchanger 7 by means of control device 9. Temperature detector 8 transmits a measuring signal to control device 9 which opens for said supply in dependence on the difference between the intended and detected temperature of the air. Supplementary water is supplied to basin 10 as a compensation for the evaporated water, controlled by means of level sensor 17a.

The hot air thus humidified is injected into chamber 1. Upon contact with the colder pig carcasses 19 water condenses on the surface thereof, thereby effecting a heating of the rind surface. The heating of the rind surface depends on the temperature and humidity of the treating air on the contact between the injected air and the rind surface.

At an average load of the apparatus according to the invention by 200 pig carcasses per hour it is possible to maintain a substantially constant temperature of 62° C. in the chamber, the air velocity in the duct amounting to 6 to 7 m/sec. This temperature does not fluctuate more than 0.5° C. when changing from idling to full load of the chamber by porkers. The temperature of the injected water varies at the same time between 67° to 77° C. in dependence on the load variations. The relative humidity in the chamber amounted to 100% according to measurements by wet and dry thermometer. 3000 liters of water were atomized per hour, the consumption of supplementary water amounted to 100 liters per hour and as the heating liquid for the shell side of heat exchanger 7 slaughterhouse waste water at a temperature of about 82° C. was used.

Pig carcasses scalded in this manner possess a very fine rind quality without red-colouring of the neck and head regions.

I claim:

1. A method of scalding of carcasses advanced through a chamber comprising circulating hot humid air through the chamber by the continuously repeated steps of:
   a) evacuating hot humid air from said chamber;
   b) supplying said evacuated hot humid air from step a) with humidity and heat; and
   c) blowing said hot humid air supplied with humidity and heat in step b) back to the chamber; wherein in step b) heat and humidity are supplied to the air by atomizing excess water into the circulating air in relation to saturation thereof with steam, of a temperature higher than that desired in the chamber.

2. A method as claimed in claim 1, wherein the temperature of said water to be atomized in step b) is regulated by means of a controllable heat source.

3. A method as claimed in claim 1, further comprising that the excess of water atomized in step b) is recirculated.

4. A method as claimed in claim 1, further comprising effecting subsequent to said atomizing of water in step b), an atomization of water of a lower temperature into the circulating air.

5. A method as claimed in claim 1, further comprising supplying dry heat to the circulating air by means of a heat source prior to said atomization of water of a temperature higher than that desired in the chamber in step b).

6. A method as claimed in claim 1, wherein the air in the chamber is kept at a temperature in the interval between 60° and 75° C. and a relative humidity of at least 90%.

7. A method as claimed in claim 1, further comprising that the temperature and/or humidity of the air blown back to the chamber in step c) is/are varied throughout the chamber, preferably at individual and independent control of the air temperature and/or humidity by treating the air as described in step b) in separate air circulation circuits and in step c) blowing said treated air back to individual section of the chamber.

8. An apparatus for scalding of carcasses advanced through a chamber comprising one or more subunits through which the carcasses to be scalded are passed, each subunit comprising a fan which on its draught side is connected with the subunit for exhaustion of the humid air from the subunit, and on its delivery side with a flow passage for blowback of the humid air to the subunit and each further comprising a water atomizer for water of a higher temperature than that desired in the subunit and a heat source for heating the water to be supplied to the water atomizer.

9. An apparatus as claimed in claim 8, comprising, as said heat source, a heat exchanger with controlled supply of heat medium, preferably by means of a control device.

10. An apparatus as claimed in claim 8, wherein said water atomizer discharges into the flow passage.

11. An apparatus as claimed in claim 8 comprising an additional atomizer for water of a lower temperature disposed after said water atomizer.

12. An apparatus as claimed in claim 8 comprising a heat source for the supply of dry heat to the humid air arranged before the first mentioned atomizer, said heat source being a heat exchanger with controlled supply of heat medium, by means of a control device allowing the admission of heat medium at a considerable thermal deficit in the circulating air.

13. An apparatus as claimed in any claim 8 or 11 comprising a basin communicating through a pump with the corresponding water atomizer, said basing or basins being located under the water atomizer or each water atomizer in the flow passage.

14. An apparatus as claimed in claim 8 wherein the heat source for heating the water to be recirculated to said water atomizer to a desired temperature is positioned in or in association with the basin below its water atomizer.

15. An apparatus for scalding of carcasses advanced through a chamber, comprising one or more subunits through which subunit(s) the carcasses to be scalded are passed, each subunit comprising a fan which on its draught side is connected with the chamber for exhaustion of the humid air from the chamber, and on its delivery side with a flow passage for blowback of the humid air to the subunit, and each further comprising a water atomizer discharging into the duct for water of a higher temperature than that desired in the chamber, a basin communicating through a pump with said water atomizer being located under the water atomizer in the flow passage, and a heat exchanger located in or in connection with said basin for heating water recirculated from said basin by means of a pump through said heat exchanger to said water atomizer, the supply of heating liquid to the heat exchanger being controlled by the air temperature in the subunit by means of a regulator.

* * * * *